No. 740,419. PATENTED OCT. 6, 1903.
D. GIBBS.
TOY.
APPLICATION FILED JULY 11, 1903.
NO MODEL. 2 SHEETS—SHEET 1.
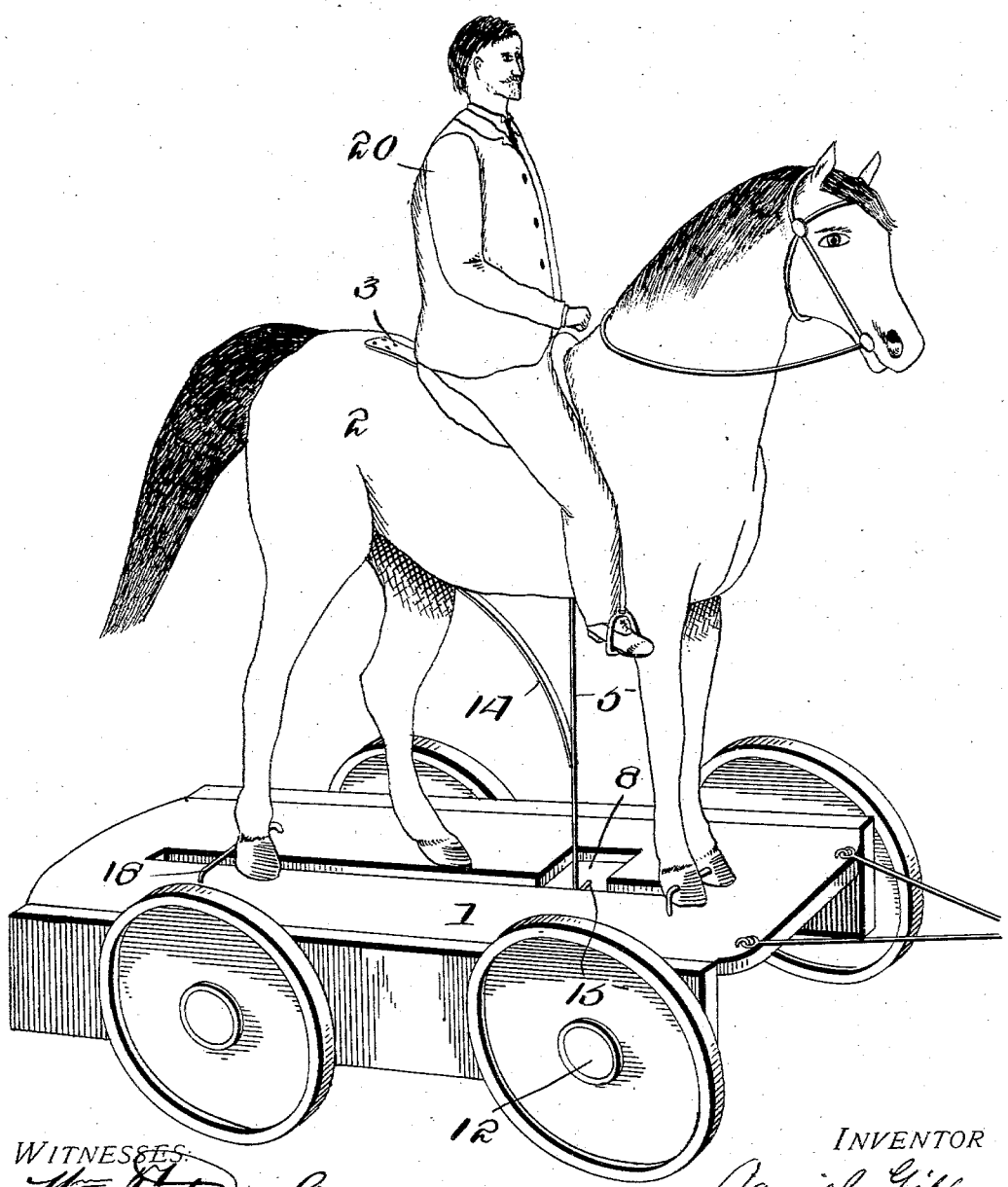

No. 740,419. PATENTED OCT. 6, 1903.
D. GIBBS.
TOY.
APPLICATION FILED JULY 11, 1903.
NO MODEL. 2 SHEETS—SHEET 2.
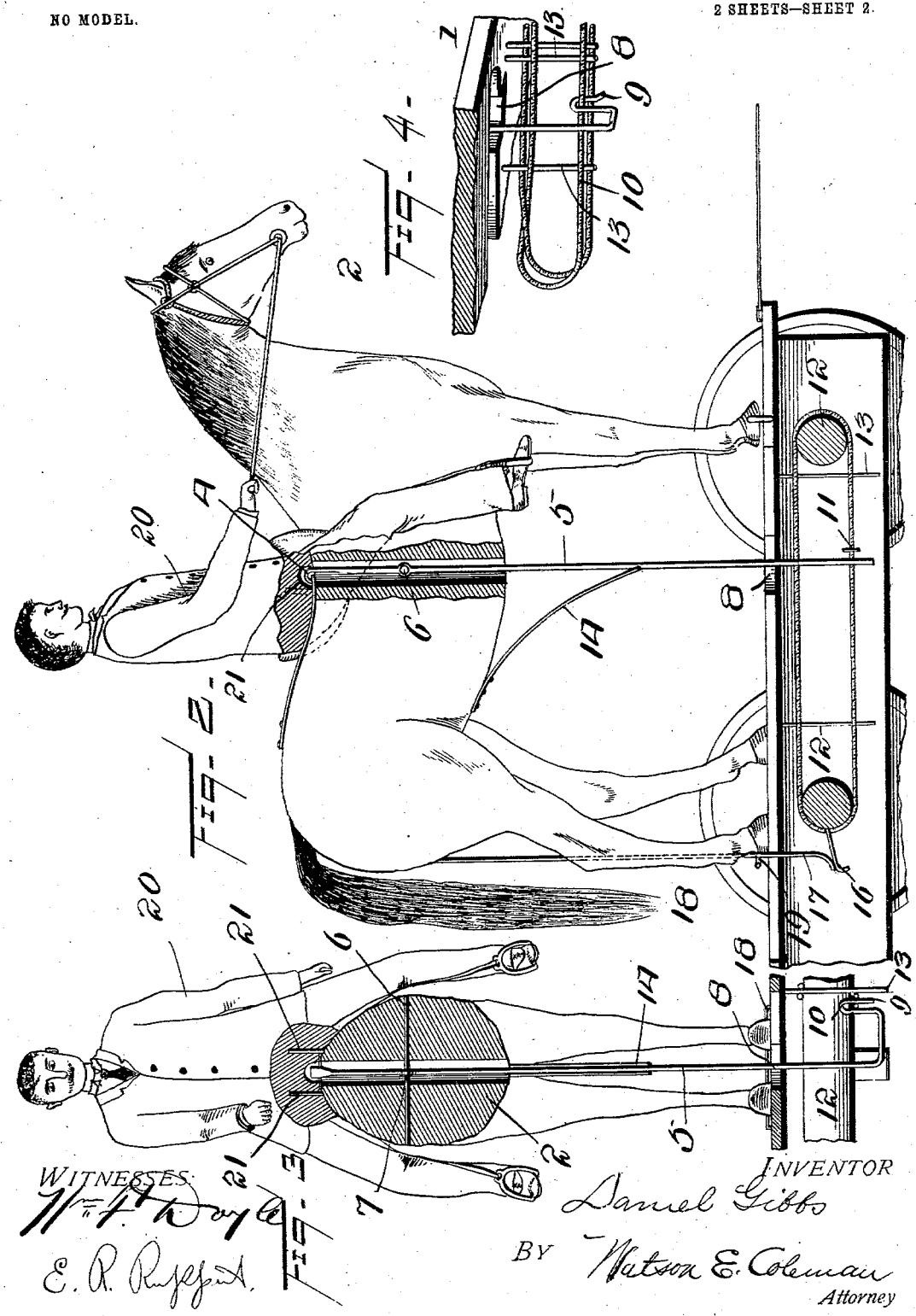
INVENTOR
Daniel Gibbs
BY Watson E. Coleman
Attorney
WITNESSES:

No. 740,419. Patented October 6, 1903.

UNITED STATES PATENT OFFICE.

DANIEL GIBBS, OF SARDIS, ALABAMA.

TOY.

SPECIFICATION forming part of Letters Patent No. 740,419, dated October 6, 1903.

Application filed July 11, 1903. Serial No. 165,043. (No model.)

*To all whom it may concern:*

Be it known that I, DANIEL GIBBS, a citizen of the United States, residing at Sardis, in the county of Dallas and State of Alabama, have invented new and useful Improvements in Wheeled Toys, of which the following is a specification.

My invention relates to wheeled toys, the object being to provide a mechanical toy of the class described in which a broncho and rider are given certain movements corresponding more or less to the natural motions of a bucking broncho endeavoring to dislodge a rider from its back, the toy being so constructed that when it is pulled or pushed over a surface the animal will assume a normal and bucking position and the rider will eventually be thrown from its back. The above-mentioned movements are produced by means of the novel construction and combination of the several parts hereinafter described, illustrated, and claimed.

In the drawings accompanying the specification and forming a part thereof, Figure 1 is a perspective view of the device. Fig. 2 is a side elevation, partly in section. Fig. 3 is a transverse section, and Fig. 4 is a perspective detail of parts.

Corresponding parts are referred to in the following description and indicated in all of the views of the drawings by the same numeral reference characters.

1 represents a wheeled platform, on which the animal 2 is pivotally mounted at the front feet, the rear feet being left free. A spring 3 is secured at one end to the back of the animal in any suitable manner and is held down beneath the rider at the other end by means of a hook 4 at the end of a trigger 5, said trigger passing through a hole in the body of the animal and being held in place by a pin 6, which pin passes through a loop formed by bending the wire comprising the trigger, as shown at 7. This trigger also passes through an aperture 8 in the platform and has its lower end bent to form a hook 9, which laps over an endless cord 10, with a knot therein, 11, which engages with said hook. The endless cord is placed around the axles 12 and is held in place on the axles by means of a plurality of pins or lugs 13, depending from the platform, as shown. To the lower portion of the body of the animal is suitably secured a spring 14, the end of which rests against the lower portion of the trigger 5 to aid in holding it in position against a pin 15 in the platform.

Secured to the rear axle is a lug 16, which at every evolution of the axle engages with a rod or wire 17, secured to the rear portion of the body of the animal, and carries the said rod upward, thereby raising the rear portion of the animal at each evolution of the axle and allowing the same to fall back by reason of its weight as soon as the lug passes beyond the rod or wire and disengages itself therefrom. A wire 18, with a loop therein, 19, is secured to the platform, and the rod 17 passes through the loop and is thereby held in place. A rider 20 is suitably mounted on the animal over the end of the spring 3 and is retained thereon preferably by means of pegs 21, which enter holes in the lower portion of the body of the rider, leaving the rider free to be dislodged when the end of the spring 3 is released from the hook 4.

In operation the movements of the animal and rider are automatic. As the platform upon which the animal is mounted is pulled or pushed forward the lug 16 at every evolution of the rear axle engages with the rod 17 and forces it upward, thus causing the elevation of the rear portion of the animal. As the lug disengages from the rod the animal resumes its normal position by reason of its weight and the laws of gravitation. The cord 10 moves around the axles until the knot 11 engages with the hook 9 and pushes the lower end of the trigger toward the rear of the platform. This causes the upper portion to recede from the spring 3, releasing the end directly beneath the rider and throwing the rider from the animal. The rider can be replaced by pressing down the spring 3 and placing the figure of the rider on the pegs 21. The periods at which the rider may be thrown can be governed by the length of the cord and the number of knots therein. In the drawings the cord is shown to be of a length that enables it to go twice around the axles, which fact causes the rider to be dislodged only at about eight revolutions of the axles. Likewise the bucking movements of the animal can be governed by the number of lugs placed on the axle. A bridle may be placed on the animal and the rein placed in the right hand of the rider held in receptive position. Therefore while I have illustrated a preferred embodiment of my invention certain modifications of form and arrangement of parts may suggest themselves, which modifications and arrangements come well within the spirit of my invention as disclosed and claimed, and I do not desire to be limited to the precise construction and arrangement shown.

Having thus described my said invention, what I claim as new, and desire to secure by Letters Patent, is—

1. In a toy, a wheeled platform, an animal pivotally mounted thereon at its front feet, a rod secured to the rear end of the animal and engaging with a lug on the rear axle, substantially as described.

2. In a toy, a wheeled platform, an endless cord adapted to engage with the axles, a knot in the cord adapted to engage with a trigger, substantially as described.

3. In a toy, an animal pivotally mounted at its front feet on a wheeled platform, a rider, means for holding the rider in place, a spring disposed beneath the rider, and means for actuating the spring, substantially as described.

4. In a toy, a wheeled platform, an animal pivotally mounted thereon at its front feet, a rider, a spring disposed beneath the rider, a trigger having a hook at its upper end adapted to hold the spring in place, a cord disposed beneath the platform and engaging with the axles, and a knot in the cord adapted to engage with the trigger, substantially as described.

5. In a toy, a wheeled platform, an animal pivotally mounted thereon at its front feet, a rider, a spring disposed beneath the rider, a trigger having a hook at its upper end adapted to engage with a spring and with the lower end bent to form a slot, a cord, means for actuating the cord, a knot in the cord adapted to engage with the slot in the lower end of the trigger, substantially as described.

6. In a toy, a wheeled platform, an animal pivotally mounted thereon at its front feet, a rider, a spring disposed beneath the rider, a trigger having a hook at its upper end adapted to engage with the spring and with the lower end bent to form a slot, a cord disposed beneath the platform, and adapted to engage with the trigger, and a series of knots in the cord, substantially as described.

7. In a toy, the combination of a wheeled platform, an animal pivotally mounted thereon at its front feet, a rod secured to the rear end of the animal and passing through a hole in the platform and engaging with a lug secured to the rear axle, a rider, a spring beneath the rider with one end secured to the back of the animal, and means for automatically releasing the spring, substantially as described.

8. In a toy, the combination of a wheeled platform, an animal pivotally mounted thereon at its front feet, a rod secured to the rear end of the animal and passing through a hole in the platform and engaging with a lug secured to the rear axle, a rider, a spring disposed beneath the rider with one end secured to the back of the animal and the other end held down by means of a hook, a trigger having the lower end bent to form a slot, a cord disposed beneath the platform and actuated by the axles, and a knot in the cord adapted to engage with the slot in the end of the trigger, substantially as described.

9. In a toy, the combination of a wheeled platform, an animal pivotally mounted thereon at its front feet, a rider, a rod secured to the rear end of the animal and engaging with a lug secured to the rear axle, a spring secured at one end to the back of the animal, a trigger having a hook at its upper end and a slot formed at its lower end, a cord passing around the axles, and a knot in the cord adapted to engage with the slot at the lower end of the trigger, substantially as described.

10. In a toy, the combination of a wheeled platform, an animal pivotally mounted thereon at its front feet, a rider, a spring disposed beneath the rider and secured at one end to the animal, a trigger, a hook at the upper end of the trigger, a rod, means for securing the rod to the animal, a lug, means for securing the lug to the rear axle, a cord disposed beneath the platform and passing around the axles, and a knot in the cord adapted to engage with the lower end of the trigger, substantially as described.

In testimony whereof I have signed my name to this specification in presence of two subscribing witnesses.

DANIEL GIBBS.

Witnesses:
 REVAULT CHERRY,
 HUGH M. STANFREE.